May 18, 1943. L. POILLEVEY 2,319,343
WEIGHING SCALE RECORDING
Filed April 29, 1940 2 Sheets-Sheet 2
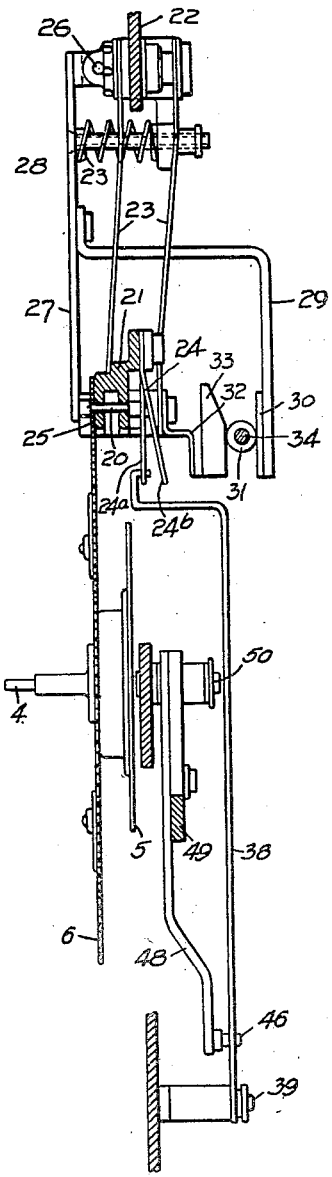
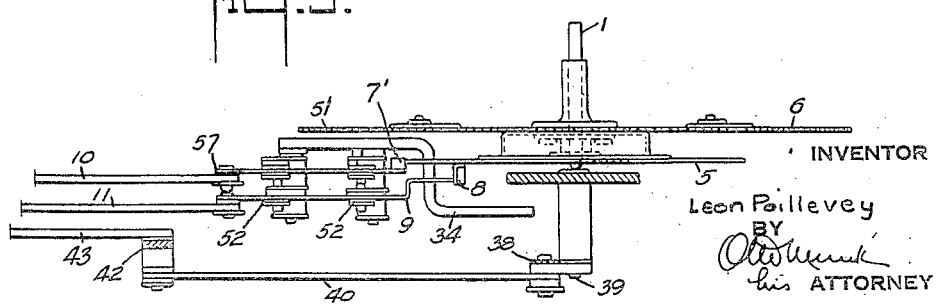
INVENTOR
Leon Poillevey
BY
his ATTORNEY Patented May 18, 1943

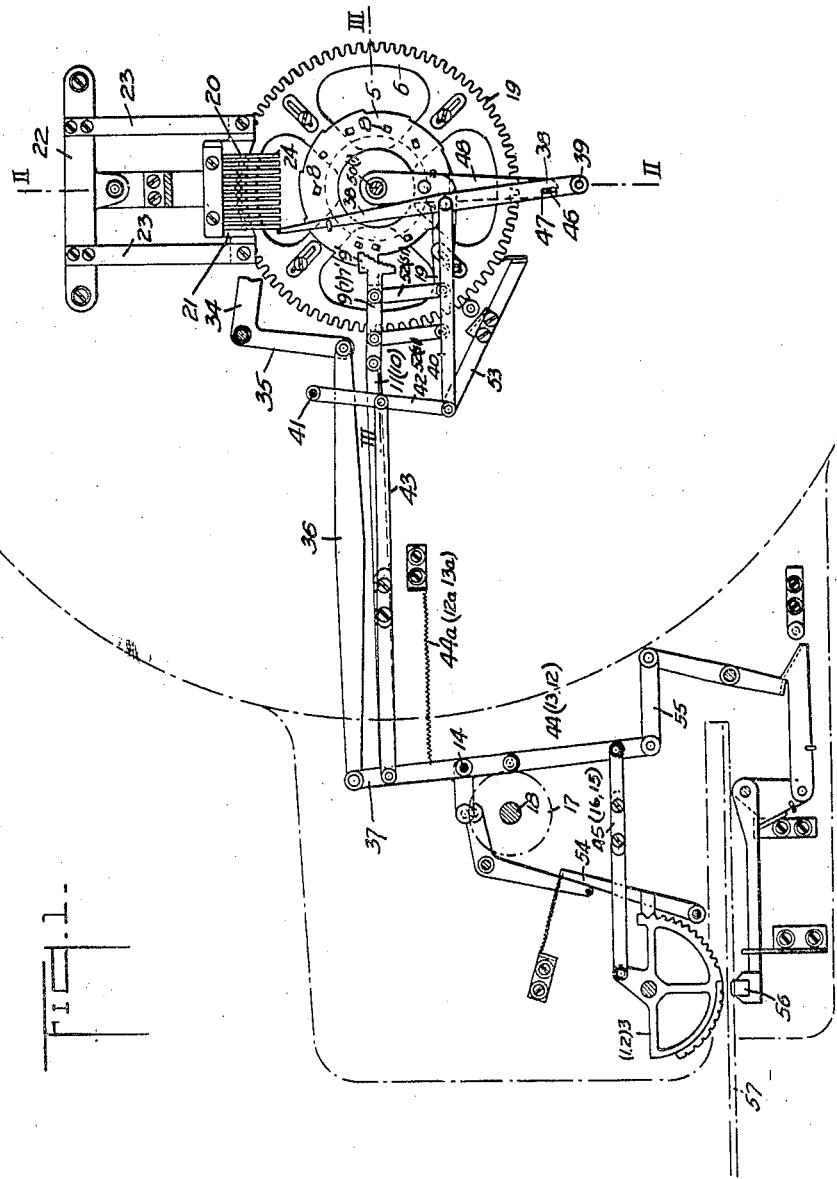

2,319,343

UNITED STATES PATENT OFFICE 2,319,343

WEIGHING SCALE RECORDING

Léon Poillevey, Paris, France; vested in the Alien Property Custodian

Application April 29, 1940, Serial No. 332,308
In Germany January 26, 1939

9 Claims. (Cl. 234—5.4)

This invention relates to the control of recording or registering mechanism (for convenience referred to hereafter merely as recording mechanism) for weighing apparatus, by which is meant apparatus adapted to effect measurements by weighing operations.

More specifically stated, the invention is concerned with that form of control means for recording mechanism which has measuring means bearing features representing digits or stages of value of a low and a higher denomination or denominations (for example units, tens and hundreds), and in which investigation of the weighing response of said measuring means is effected by the co-operation thereof with feeler devices, the feeler devices and measuring means taking up variable relative positions of alignment depending upon the load. The relative movement of the measuring means and such feeler devices during the investigation operation is used to control the transmission of the appropriate values to the recording mechanism, but the present invention is not concerned with the particular form of such recording mechanism which may, for example, give a printed or like permanent record, or a visual indication of the measurement, or total of a series of measurements, or a combination of these.

It will be understood that in recording mechanism control means of the form stated, as all the measuring means feeler devices undergo variation in alignment together under the applied load, then if the measurement effected by the measuring means of a low weight stage amounts to a fraction of a unit of a higher weight stage, difficulty arises because the measuring means for such higher stage will not be in the same position of alignment with its feeler means as it would have been had there been no fraction indicated by the measuring means of the lower weight stage.

An object of the present invention is a recording mechanism control means of the form stated above in which provision is made to "rectify" the feeler means co-operating with the measuring means of a higher weight stage, that is to say to provide for compensating the alignment of the feeler means and measuring means of that stage in accordance with the response of the feeler means of a lower stage.

Another object of the invention is an apparatus of the kind referred to in which the figures of the lowest weight stage are transmitted by means of a measuring means which, like the measuring means provided for the higher weight stage or stages, is set in accordance with the response of the weighing scale, and can therefore be rigidly associated with said higher-stage measuring means. The measuring means provided for the lowest weight stage has arranged thereon a succession of numeral-representing means, for example slots or fingers, which should have an enlarged graduation or enlarged spacing in comparison with the graduations of the scale.

One example of the invention is illustrated in the drawings, in which the feeler-device for the low-weight stage is formed by a group of primary feelers, and the intermediate means by a secondary feeler investigating said primary feelers, and in which:

Figure 1 is a general view of the transmission device and a printing mechanism from the side remote from the scale of the weighing machine, individual parts being omitted in order to reveal parts hidden thereby, Figure 2 is a vertical section on line II—II of Figure 1, Figure 3 is a horizontal section on line III—III of Figure 1.

Referring to the example illustrated in the drawings, it is assumed that the weight indicated by the weighing machine is to be transmitted to a printing mechanism as a three-figure number. The weight is thus divided into three stages, namely and for example tens of kilograms, unit kilograms and tenths of kilograms. The printing mechanism (which appears on the left in Figure 1) has three type wheels 1, 2 and 3, only one of which is visible in the drawings, the other two being hidden by the visible type wheel. The following mechanism is provided for setting these type wheels from the weighing machine:

On the needle spindle 4 of the weighing machine are mounted two rigidly interconnected measuring elements 5 and 6 for initiating the "transmission" of the weight indications to the printing mechanism. In the example under consideration these are firmly coupled to the spindle 4, so that they are set directly by the deflection of the needle. Alternatively they could be rotatable on the spindle 4 and rotated in known manner in accordance with the deflection of the needle of the weighing machine. The measuring element 5 (which will be considered as the "main" measuring element) serves to transmit the figures of the highest weight stage, namely the tens of kilograms, and consists of a disc provided at its peripheral edge in known manner with graduations or steps of arc length corresponding to the distance between two "tens of kilograms" scale divisions of the indicator scale of the weighing machine. Co-operating with the stepped periphery of the disc 5 is a feeler 7 for the highest weight stage provided with a flat projection or a kind of blade 7¹, this feeler being somewhat radially movable relatively to the disc. At the same time however the disc 5 serves for measuring and transmitting the numbers of the unit kilograms. For this purpose it is provided at every step or graduation of its periphery with a flat pin 8, extending parallel with the axis of rotation, with which co-operates a feeler 9 for the second weight stage which is somewhat radially movable with respect to the disc 5 and has its forward edge 9¹ provided with ten steps or graduations. The length of each of these steps corresponds to the spacing between adjacent kilogram divisions of the machine scale. Instead of the pins 8 a third measuring disc could be provided having on its periphery successive groups each of ten steps, the feeler 9 having a construction similar to the feeler 7. The two feelers 7 and 9 for the tens and unit kilograms are connected respectively by push rods 10, 11 to corresponding levers 12, 13 acted upon by springs 12a, 13a acting to move the respective feelers against the disc. The levers 12, 13 are mounted on a common shaft 14 and are in turn coupled to the type wheels 1 and 2 respectively by means of push rods 15 and 16. Each lever carries a roller contacting with a cam plate (indicated on the left in Figure 1 by a dot-and-dash circle 17), whereby the feelers 7, 9 are held in their extreme rearward position against the action of the springs 12a, 13a. On rotation of the cam plates the levers 12, 13 lose their support, so that the feelers 7, 9 are advanced by the springs towards the measuring elements and as a result the type wheels 1, 2 are set in position. In Figure 1 the feeler 7 for the tens of kilograms is hidden by the feeler 9 for the unit kilograms. In addition, the push rods 10, 11 are largely, and the levers 12, 13 and push rods 15, 16 wholly hidden by similar rods and levers for setting the type wheel 1 for the tenths of kilograms, which is in the front in Figure 1. The cam plates 17 are mounted on a common spindle 18 (control spindle) by which the other parts of the transmission mechanism are controlled.

The measuring element 6 (which will be considered as the "auxiliary" measuring element) consists of a thin disc provided at its edge with radial slots or recesses 19. It is intended for the figures of the lowest weight stage (tenths of kilograms). The graduation of the measuring numeral-representing means formed by the slots 19 is made greater than the relative spacing of the divisions provided on the scale of the weighing machine for the tenths of kilograms, being in fact ten times larger, so that each ten slots 19 are distributed over an arc length which corresponds to the spacing between two divisions for the tens of kilograms on the scale. The investigation of the figures of the lowest weight stage is effected by primary feelers 20, which may be regarded, in effect, as part of the measuring element 6 and as constituting the weight responsive measuring element for the lowest weight stage, and a secondary feeler 38 which constitutes the investigating feeler proper, corresponding to the feelers 7, 9. The primary feelers 20, of which there are ten, co-operate with the disc 6, these feelers consisting of pins moving perpendicularly to the disc and fitting into the slots 19. The pins 20 are arranged in an arcuate row one behind an other along the periphery of the disc 6. Their relative spacing is one tenth smaller than that of the slots 19, so that they form a vernier with the slots of that section of the edge of the disc 6 which is located opposite to them. Thus only one pin 20, namely the pin which corresponds to the figure in question of the smallest weight stage, registers with a slot in such a way that it can pass through the disc, whilst the other pins come into contact with the teeth of the disc situated between the slots 19 and are thus arrested.

The pins 20 are guided in a holder 21 suspended on a fixed plate 22 in such a way as to be oscillatable at right angles to the disc 6. This suspension is effected by means of two pairs of leaf springs 23 so arranged that each pair forms a linked parallelogram, so that the holder 21 undergoes a parallel motion when moved towards the disc 6. At the same time the leaf springs 23 serve to retain the holder 21 with the pins normally spaced from the disc 6, being suitably adjusted for this purpose. All the pins 20 are subject to the action of leaf springs 24 attached to the holder 21 and are normally pushed forward by these springs 24 so that their ends adjacent to the disc 6 project from the holder 21. The leaf springs 24 are arranged with their free ends extending towards the middle of the disc 6. On the side of the disc 6 remote from the pin holder 21 a support plate 25 is arranged, which is provided with a series of holes for the entry of the pins 20. The plate 25 is carried by a rigid lever 27 pivotally mounted on an axis 26 on the fixed plate 22, this lever being acted upon by a compression spring 28 holding the support plate 25 somewhat away from the disc 6. A cranked arm 29 attached to the support plate carrier 27 engages round the holder 21 from above. On the inside of the cranked portion there is provided a somewhat raised cam surface 30 for a roller 31 which will be described later. Opposite the cam surface 30 there is arranged on an arm 32 attached to the holder 21 a pressure element 33 provided with an oblique surface. The roller 31 in the space between the cranked arm 29 and the holder 21 is carried by the free end of one arm 34 of a bell-crank lever 34, 35, whose other arm 35 is coupled by a connecting rod 36 to a lever 37 pivotal about the axis 14. This lever 37 co-operates with a cam plate mounted on the control spindle 18 for moving the roller lever 34, 35.

When the lever 34, 35 is rotated to move its arm 34 downwards, the roller 31 first runs along the raised cam surface 30 of the cranked arm 29, whereby the support plate 25 is brought in contact with the disc 6. Immediately afterwards, due to the co-operation of the roller 31 with the pressure element 33, the holder 21 is moved with the pins 20 against the disc 6, so that the pins now feel for the figure of the tenths of kilograms. When the lever arm 34 carrying the roller 31 swings upwards again, the holder 21 with the pins and the support plate 25 return to their inoperative position. As the holder 21 is moved towards the disc 6, one of the pins 20 passes through a slot 19 in the disc into a hole in the support plate 25, with the result that the leaf spring 24 takes up the vertical position indicated in Figure 2 by 24a, in which position it is approximately parallel to the disc 6. The other pins however meet the teeth of the disc 6 and are pressed back into the holder 21, so that their leaf springs 24 occupy the oblique position indicated at 24b in Figure 2, that is to say they are moved away from the disc 6.

The free ends of the leaf springs 24 form stops for the secondary feeler of the lowest weight stage. This feeler consists of a lever 38 oscillating in a plane parallel to the disc 6 about a fixed axis 39 on the side of the needle spindle 1 remote from the group of primary feelers 20, and with its end extending towards the latter. The free end of the lever 38 consequently moves through a path lying in a plane substantially parallel to the row of stops formed by the ends of the springs 24. The lever 38 is bent in such a way that its free end moves in the plane containing the leaf spring 24 of that pin 20 which has passed through a slot 19 of the disc 6. The lever 38 which, in the inoperative position (Figure 1), lies on the left of the pins 20 comes into contact, when rotated towards the right, with the leaf spring 24a of that pin 20 of the series of pins which is then in action, and its movement is thus restricted (see Figure 2). Since the pin 20 on the left in Figure 1 corresponds to the figure 0, whilst the right-hand pin corresponds to figure 9, the lever 38 traverses in each stroke a distance whose length bears a certain ratio to the figure for the tenths of kilograms indicated by the weighing machine. It thus "feels" the number of tenths of kilograms from the stops formed by the leaf springs of the contactor pins 20. Instead of being formed by the springs 24 the stops could be formed by the free ends of the actual pins 20. In this case the holder 21 with the pins 20 is arranged on the other side (left-hand side in Figure 2) of the disc 6 and the pins are made of such a length that the pin passing through the disc 6 projects out of the hole in the support plate 25 (which is now disposed on the right-hand side of the disc 6 in Figure 2) and extends into the path of the free lever 38.

The feeler lever 38 is connected by a push rod 40, a lever 42 pivotal about a fixed pivot 41, and a further connecting rod 43, to a lever 44 pivotal about the axis 14, the said lever 44 being coupled in turn to the type wheel 3 of the printing mechanism provided for the lowest weight stage by means of a connecting rod 45. The lever 44 is engaged by a spring 44a which tends to move the rods in the direction corresponding to the movement of the feeler 38 but this action is normally prevented by a roller provided on the lever 44 bearing against a cam plate mounted on the control spindle 18.

The feeler lever 38 is coupled by means of a pin 46 and slot 47 to a lever 48 pivotal about an axis 50 concentric with the needle spindle 1. The lever 48 has an arm projecting laterally on the side where the feelers 7 and 9 are located, and two pairs of connecting rods 51 and 52 are connected by their lower ends to this arm. The upper ends of one pair of rods 51 are connected to the feeler 7 and the upper ends of the other pair of rods 52 to the feeler 9. Thus, as indicated in the drawings, the two pairs of rods 51, 52 form parallel link guides, one for each of the keys 7 and 9. These guides, and with them the feelers 7, 9, are vertically adjustable by rotation of the lever 48 about its axis 50, this adjustment being in proportion to the rotation of the feeler lever 38. Owing to the fact that the pin 46 is situated at the free end of the lever 48, whilst the slot 47 is adjacent to the pivot end of the feeler lever 38, the rotation of the latter lever is transmitted on a reduced scale to the lever 48. The ratio of transmission is such that rotation of the feeler lever 38 through an angle corresponding to the distance between two pins 20 or two stops 24 causes an upward movement of the feelers 7 and 9 by an amount corresponding to the tenths of kilograms division of the scale of the weighing machine. When the weighing machine indicates a whole number of kilograms the feelers 7, 9 are in their lower extreme position (Figure 1). If on the other hand the machine indicates fractions of kilograms, the feelers are lifted by a corresponding amount, that is to say by such an amount that the position of the feelers 7 and 9 relative to the numeral-representing elements of the disc 6 corresponds to a whole kilogram indication, namely the complete kilogram number just passed by the needle of the weighing machine. The feelers 7, 9, are thereby set or "rectified" in such a way that the feeler 9 on the one hand always strikes with the middle of one of its steps $9^1$ on the edge of that pin 8 of the disc 5 which is to be investigated, whereby slipping of the steps from the pin is avoided. On the other hand the feeler 7, when it contacts with the periphery of the disc 6 in the neighbourhood of the ends of a step, is always sufficiently remote from the end edge of the step to be safe against slipping. In this way those errors which might occur if the feelers were not properly directed are eliminated.

A still further "rectifying" device is provided, namely a device which, when the needle of the weighing machine stops between two scale divisions for the tenths of kilograms, returns the needle and with it the measuring elements 5, 6 to the division on the scale that has just been passed, so that the weight shown by the machine and which is to be investigated is rounded off to a whole and investigatable part of the lowest weight stage. This device which might be called a "rounder-off," consists of a pawl 53 engaging in the slots of the disc 6, said pawl 53 being moved through the intermediary of a connecting rod (hidden in the drawings by the mechanism of the feeler lever 38) and a lever pivotal about the axis 14, by a cam plate mounted on the control spindle 18.

The so-called control spindle 18, finally, carries a further cam plate which, when the type wheels 1, 2, 3 are being set, temporarily disengages a locking lever 54 thereof, and still another cam plate which, through the intermediary of a lever mechanism 55 moves a hammer 56 provided in the printing mechanism. The said hammer serves to impel the weight ticket which is to be printed towards the type of the wheels 1 to 3 which are set at the printing place. The ticket to be printed is disposed on a table 57 provided with an aperture for the passage of the hammer 56 and is brought into the printing position by rotation of the hammer.

The manner in which the device operates is as follows:

When the weighing machine has been balanced the control spindle 18 is rotated either by hand or by means of a small electric motor or the like. By means of the corresponding cam plate the "rounding off" pawl 53 is operated, so that the needle of the weighing machine with the measuring elements 5, 6 is set to the next lower tenths of kilogram division of the scale of the machine. The lever 34, 35 is then rotated by its cam plate, with the result on the one hand that the support plate 25 is brought into contact with the disc 6 and on the other hand that the holder 21 with the primary feeler pins 20 of the lowest weight stage is moved towards the said disc. That pin 20 which corresponds to the number of tenths of a kilogram indicated by the weighing machine passes through a slot 17 in the disc, and the leaf spring 24 of this pin is brought into the path of the secondary feeler lever 38 of the lowest weight stage. The lever 44 coupled to the feeler lever 38 is then released by its cam plate, and the feeler lever is rotated by the spring 44a in clockwise direction until it strikes the leaf spring 24a corresponding to the pin 20 projecting through the disc 6 (Figure 2). During this movement the type wheel 3 for the lowest weight stage is set through the intermediary of the lever mechanism 40, 42, 43, 44, 45 and at the same time the feelers 7 and 9 for the higher weight stages are adjusted or "rectified." The levers 12 and 13 of these two feelers are then released by their cam plates and the keys 7, 9 are advanced by the springs 12a, 13a until their movement is stopped by a step of the disc 5 or by a pin 8. The type wheels 1, 2 for the tens of kilograms and unit kilograms are set during this operation by means of the lever mechanisms 10, 12, 15 and 11, 13, 16. Finally the hammer 56 is released, and the set figures on the type wheels 1-3 are printed on the previously positioned weight ticket. When this has taken place all the parts are returned to their initial positions by the cam plates on the control spindle 18.

The scope of the invention is, of course, not confined to the example illustrated; on the contrary many modifications are possible, as well as different constructions. For example the number of feelers co-operating with the disc 6 could be other than ten, the number depending entirely upon the desired degree of sub-division of the lowest weight stage. The secondary feeler lever 38 co-operating with the primary feelers 20, 60 or the stops 24, 61 associated therewith could be replaced, if desired, by a feeler sliding in a guideway. Instead of the printing mechanism shown in Figure 1 an indicating device with adjustable number discs could be provided, or a recording device, for example an adding machine with calculating elements adapted to be set in accordance with the weight shown by the weighing machine. Instead of being constructed as discs, the measuring elements could be drums or strips, and if desired the measuring elements for all the weight stages could be united in a single structural body.

I claim:

1. Apparatus for transmitting the weighing-response of a weighing scale to a recording mechanism in a plurality of stages of value, comprising weight-responsive measuring means for different stages which are set in accordance with said response; non-weight-responsive feeler means which investigate said response-measuring means and control the transmission to the recording mechanism in accordance with the investigation, said feeler means including a feeler-device to investigate measuring means associated with a lower stage; and an intermediate means co-operating with said feeler-device, said intermediate means, upon the feeler-device undergoing an investigation movement, acting to transmit movement from said feeler device to the feeler means which investigate the measuring means of a higher weight stage so as to shift said feeler means transversely to the feeling motion thereof, in a sense, and by an amount which is a function of the investigation movement of said feeler-device, such as will act to compensate for movement of said higher stage measuring means beyond the position for registering an exact unit with no fractions in the lower stage.

2. Apparatus for transmitting the weighing-response of a weighing scale to a recording mechanism in a plurality of stages of value, comprising weight-responsive measuring means for different stages which are set in accordance with said response, said measuring means having numeral-representing means thereon; non-weight-responsive feeler means which investigate said numeral-representing means and control the transmission to the recording mechanism in accordance with the investigation, said feeler means including a feeling element adapted to investigate measuring means associated with a lower weight stage and engageable with one numeral-representing means thereof at a time; with an intermediate means cooperating with said feeling element, said intermediate means, upon the feeling element undergoing an investigation movement, acting to transmit movement from said feeler device to the feeler means which investigate the measuring means of a higher weight stage so as to shift said feeler means transversely to the feeling motion thereof, in a sense, and by an amount which is a function of the investigation movement of said feeler-device, such as will act to compensate for movement of said higher stage measuring means beyond the position for registering an exact unit with no fractions in the lower stage.

3. Apparatus for transmitting the weighing-response of a weighing scale to a recording mechanism in a plurality of stages of value, comprising weight-responsive measuring means for different stages which are set in accordance with said response; non-weight-responsive feeler means which investigate said response-measuring means and control the transmission to the recording mechanism in accordance with the investigation, said feeler means including a feeler-device to investigate measuring means associated with a lower stage; an intermediate means co-operating with said feeler-device, said intermediate means, upon the feeler-device undergoing an investigation movement, acting to transmit movement from said feeler device to the feeler means which investigate the measuring means of a higher weight stage so as to shift said feeler means transversely to the feeling motion thereof, in a sense, and by an amount which is a function of the investigation movement of said feeler-device, such as will act to compensate for movement of said higher stage measuring means beyond the position for registering an exact unit with no fractions in the lower stage; lever mechanism connecting said intermediate means and higher-stage feeler means to the parts of the recording mechanism to be operated, for transmission of the result of the investigation thereto; and cam means controlling the operation of the feeler means and associated mechanism, said cam means being on a control spindle controlling in common the transmission mechanism and the recording mechanism operated thereby.

4. Apparatus for transmitting the weighing-response of a weighing scale to a recording mechanism in a plurality of stages of value, comprising weight-responsive measuring means for a lower stage having a succession of numeral-representing means arranged thereon, weight-responsive measuring means for at least one higher stage, said lower and higher stage measuring means being rigidly interconnected, feeler means to directly investigate the numeral-representing means of the respective measuring means, including the measuring means of said lower stage, intermediate means associated with the lower stage feeler means and acting to shift higher stage feeler means transversely to the feeling motion thereof in accordance with the response of said lowest stage feeling means, and means for transmitting the result of the investigation to the recording mechanism.

5. In or for a weighing scale having recording mechanism, apparatus for transmitting the weighing-response of the scale to the recording mechanism in a plurality of stages of value, comprising feeler means to investigate one stage of value of said response, feeler means to investigate a further and higher stage of value of said response, and means, operative upon investigating movement of said lower stage feeler means, to impart a compensating movement to said higher stage feeler means, said compensating movement being derived from and its extent being a function of the investigating movement of the lower stage feeler means, and taking place transversely to the feeling movement in a sense such as will maintain proper alignment of the higher stage measuring means and its feeler means for registration of the same unit irrespective of the fraction thereof registered by the lower stage mechanism.

6. In or for a weighing scale having recording mechanism, apparatus for transmitting the weighing-response of the scale to the recording mechanism in a plurality of stages of value, comprising measuring means for the respective stages which moves in unison upon a response of the scale, feeler means to investigate the measuring means of one stage, feeler means to investigate measuring means of a further and higher stage, and means, operative upon investigating movement of said first-mentioned feeler means, to impart a compensating movement to said higher stage feeler means which is transverse to the direction of the feeling movement and tends to cause the higher stage feeling means to engage at a constant position on the corresponding measuring means throughout a range of measurements of the lower stage that corresponds to one unit of the higher stage.

7. Weighing apparatus having recording mechanism control means comprising measuring means having quantity-representing features corresponding to stages of value of a low and at least one higher denomination, and feeler devices which engage with said measuring means to effect investigation thereof, which measuring means and feeler devices take up a variable relative position depending upon the load, and the extent of the relative movement of the measuring means and such feeler devices required to effect engagement being used to control the transmission of the appropriate values to the recording mechanism; said control means further comprising means permitting relative adjustment of the feeler device and measuring means of a higher stage to effect a variation in the alignment thereof in the same sense as is required to alter the value ascertained by the investigation and means for effecting such adjustment, said adjusting means being operated by virtue of the relative movement undergone during investigation by the feeler device and measuring means of a low stage so as to produce an adjustment which is such a function of said movement and takes place in such a sense as will tend to maintain proper alignment of the higher stage feeling device and its measuring means irrespective of the fraction measured by the measuring means of the lower weight stage.

8. Weighing apparatus having recording mechanism control means comprising measuring means having quantity-representing features corresponding to stages of value of a low and at least one higher denomination, and feeler devices which engage with said measuring means to effect investigation thereof, which measuring means and feeler devices take up a variable relative position depending upon the load, and the extent of the relative movement of the measuring means and such feeler devices required to effect engagement being used to control the transmission of the appropriate values to the recording mechanism; said control means further comprising means for effecting bodily relative movement of the feeler device and measuring means of a higher stage to adjust the alignment thereof in the same sense as is required to alter the value ascertained by the investigation, said bodily movement being derived from, and its extent being such a function of, the relative movement undergone during investigation by the feeler device and measuring means of a lower weight stage, and taking place in such a sense, as will tend to maintain proper alignment of the higher stage feeler device and its measuring means, irrespective of the fraction measured by the measuring means of the lower weight stage.

9. Weighing apparatus having recording mechanism control means comprising weight responsive measuring means representing stages of value of a low and at least one higher denomination, and feeler devices which are moved into engagement with said measuring means to effect investigation of the weighing response thereof, the extent of the movement of said feeler devices required to effect such engagement being used to transmit the appropriate values to the recording mechanism; said control means further comprising means for transmitting movement from the feeler device of a lower stage to the feeler device of a higher stage, which movement is derived from and is a function of the movement undergone during investigation by said lower stage feeler device, and takes place transversely with respect to the investigation movement of said higher stage feeler device and in a sense and to an extent tending to maintain proper alignment or registry thereof with its measuring means.

LÉON POILLEVEY.